United States Patent [19]
Raymond, Jr.

[11] Patent Number: 5,152,501
[45] Date of Patent: Oct. 6, 1992

[54] BUTTERFLY VALVE

[75] Inventor: Frank J. Raymond, Jr., Houston, Tex.

[73] Assignee: Bray International, Inc., Houston, Tex.

[21] Appl. No.: 794,839

[22] Filed: Nov. 21, 1991

Related U.S. Application Data

[63] Continuation of Ser. No. 647,171, Jan. 24, 1991, abandoned, which is a continuation of Ser. No. 526,777, May 17, 1990, abandoned, which is a continuation of Ser. No. 37,196, Apr. 10, 1987, abandoned.

[51] Int. Cl.$^5$ .............................................. F16K 1/22
[52] U.S. Cl. ..................................... 251/305; 251/308
[58] Field of Search ....................... 251/305, 306, 308

[56] References Cited

U.S. PATENT DOCUMENTS

| | | | |
|---|---|---|---|
| 3,043,557 | 7/1962 | Stillwagon | 251/306 |
| 3,508,737 | 4/1970 | Sikorcin | 251/306 |
| 3,565,394 | 2/1971 | Smith | 251/306 |
| 4,146,206 | 8/1979 | Malloy et al. | 251/306 X |
| 4,176,820 | 12/1979 | Broadway | 251/306 X |

FOREIGN PATENT DOCUMENTS 1077399 7/1967 United Kingdom .
1384361 2/1975 United Kingdom .

OTHER PUBLICATIONS

"Lunhenheimer" Company Catalog, 125 Tycos Dr. Toronto Ontario M0B 1W6 Jan. 1986.

Primary Examiner—John C. Fox
Attorney, Agent, or Firm—Vaden, Eickenroht, Thompson, Boulware & Feather

[57] ABSTRACT

There is disclosed a butterfly valve having a stem which extends through a disc rotatable within a seat about an annular hub to open and close the valve. The stem and disc have flat sides which engage one another in order to rotate the disc within the stem, and outer end of the stem is releasably retained in a bore through a neck on the hub.

1 Claim, 2 Drawing Sheets

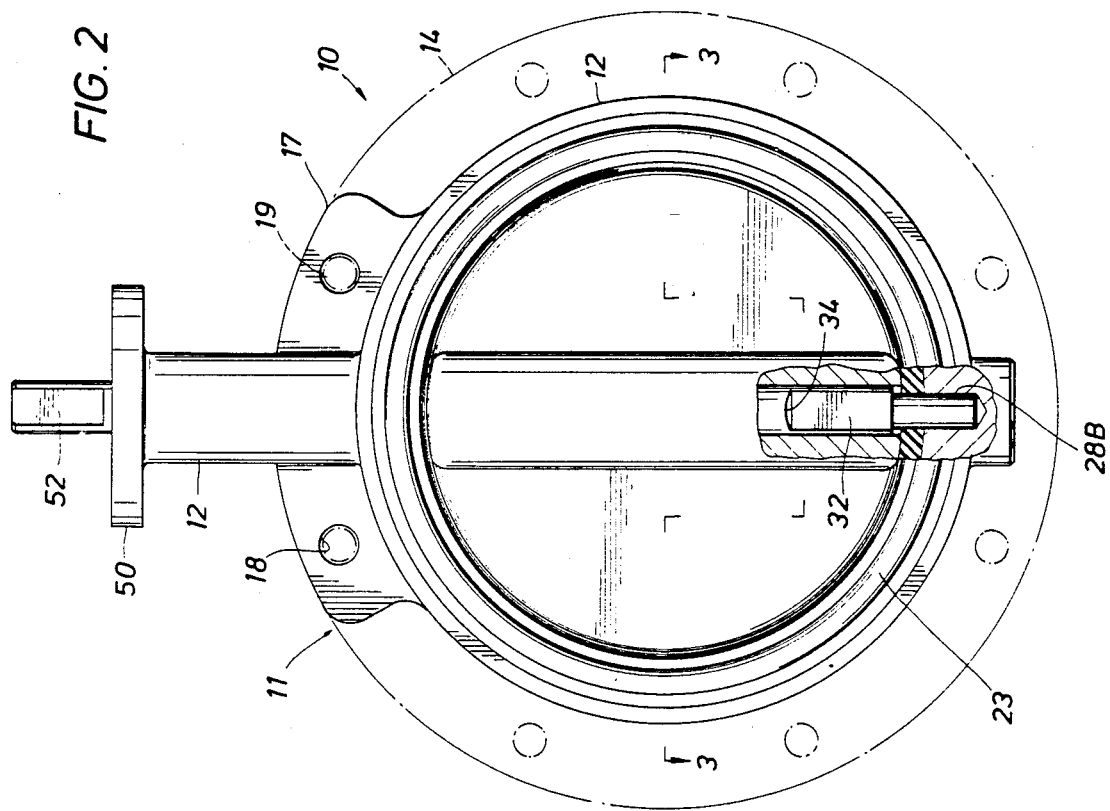
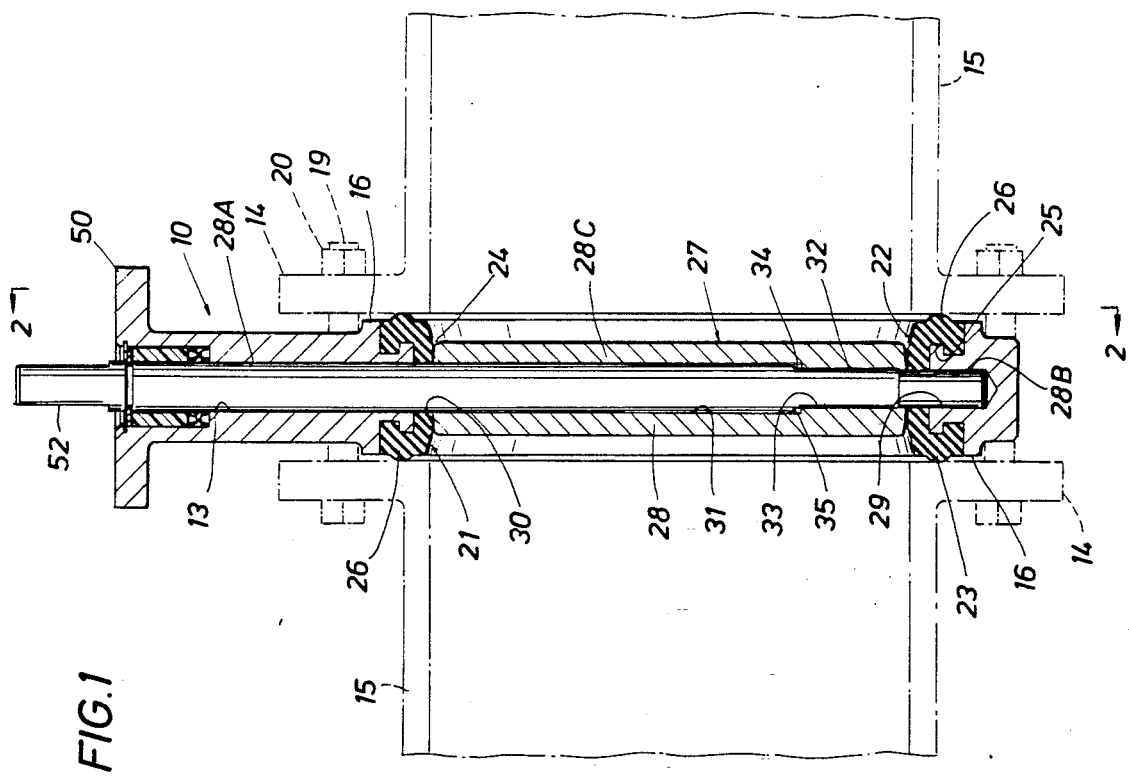

BUTTERFLY VALVE

This application is a continuation of copending application Ser. No. 07/647,171 filed on Jan. 24, 1991, now abandoned, which is a continuation of application Ser. No. 07/526,777 filed on May 17, 1990, now abandoned, which is a continuation of Ser. No. 07/037,196 filed on Apr. 10, 1987, now abandoned.

This invention relates in general to butterfly valves. More particularly, it relates to improvements in a butterfly valve of the type which includes a seat of rubber or other resilient material which lines an annular hub in order to sealably engage with the periphery of a disc rotatable in the hub to open and close the valve, and a stem for so rotating the disc which is removable from the hub and seat to permit assembly and disassembly of the valve when, for example, the seat and/or disc need repair or replacement.

In butterfly valves of this type, one end of the stem is journaled within a hole in the hub and the other end thereof extends through and is journaled in a bore through a neck extending from the hub so as to provide a part to which an actuator may be attached for rotating the stem. In some such valves, the stem extends from one end to the other through a hole in the stem, while in other valves of this type, the ends of the stem are separate from one another and extend into oppositely disposed holes in the periphery of the disc. In this latter case, the end opposite that journaled in the neck extends through a hole in the hub so that both ends may be removed from the disc during assembly and disassembly. In either case, the periphery of the disc includes annular portions surrounding the ends of the stem and adapted to sealably engage annular portions of the seat through which the ends of the stem extend so as to isolate the holes in the hub from the interior of the valve.

In those valves in which the stem extends through the disc, the disc is connected to the stem for rotation therewith by means of screws or pins which extend through the sides of the disc and into the stem. These fasteners provide leak paths past the disc and into the holes in which the ends of the stem are journaled, and may cause corrosion between the stem ends and holes in the hub. Also, these fasteners may cause structural failures as well as undesirable flow characteristics due to interrupted flow paths past the fasteners in the open position or the disc. Additionally, since the fasteners are exposed to fluid in the valve, they also are susceptible to corrosion, thereby making it difficult to remove the stem in order to disassemble the parts of the valve. Still further, the weight of the stem is transmitted to the disc through the fasteners, and thus may cause uneven compression on the seat about the periphery of the disc when the valve is upright.

On the other hand, valves in which the stem is made of separate parts require complicated assembly and repair of the valve as compared with a valve having a single stem. Because of the possible leakage of line fluid past the primary seal between the disc and seat about each of the stem portions, and thus the risk of the stem portions being blown out, one or preferably both of them is held in its hole on bore by means of a roll pin. As will be appreciated, the roll pins constitute parts which may corrode and interfere with disassembly of the valve for purposes of repair and replacement.

An object of this invention is to provide a butterfly valve of the type described which obviates these and other problems with prior valves of this type.

A more particular object is to provide a valve of this type wherein the disc is releasably held in a position rotatably connected to a one piece stem without the need of fasteners or other parts exposed to line fluid, and wherein the stem is retained in such position by means which is easily and quickly releasable to permit repair or replacement of parts of the valve with a minimum of time and effort.

These and other objects are accomplished, in accordance with the illustrated embodiments of the invention, by a valve of the type described wherein the stem includes a portion intermediate its ends which extends through the disc and includes a non-circular part fitting closely within a non-circular part on the disc, whereby the disc may be rotated by the stem between opened and closed positions by means of an actuator connected to the end of the stem which extends through the housing bore. More particularly, the stem is movable axially into and out of close-fitting position within the seat and disc, and the outer end of the stem is engaged by means on the neck which retains it in its operating position, but which is easily and quickly releasable to permit removal of the stem during replacement and repair of the disc and/or seat.

In the illustrated and preferred embodiment of the invention, the non-circular parts of the stem and hole in the disc are flat, generally parallel surfaces adjacent the inner end of the stem so as to minimize reduction in the strength of the stem. Also, the outer end of the bore of the neck is diametrically enlarged and the stem retaining means includes a groove about the stem opposite the outer end of the bore, circumferentially split rings having their inner edges within the groove and their outer edges fitting closely within the enlarged outer end of the bore, and means releasable attachable to the neck and engageable with the outer edges of the split rings for releasably retaining them in the outer end of the bore. Preferably, the enlarged outer end of the bore has a groove thereabout, and a split ring is adapted to be moved to and out of a position in the groove in which it engages the outer edges of the split rings.

A seal ring is disposed about the stem within the outer enlarged end of the bore for sealably engaging therebetween, and a bushing surrounds the stem within the outer end of the bore intermediate the seal ring and split ring to absorb lateral thrust on the stem due to the actuator. The seal ring is preferably of such construction as to seal in both directions and thus protect the interior of the valve against foreign matter outside of it as well as to protect the retaining means against the corrosive effects of line fluid.

In the drawings, wherein like reference characters are used throughout to indicate like parts:

FIG. 1 is a vertical sectional view of a valve constructed in accordance with the present invention and installed between the ends of a conduit shown in broken lines and showing the disc thereof in closed position;

FIG. 2 is an end view of the valve, as seen along broken lines 2—2 of FIG. 1;

Figure 3:
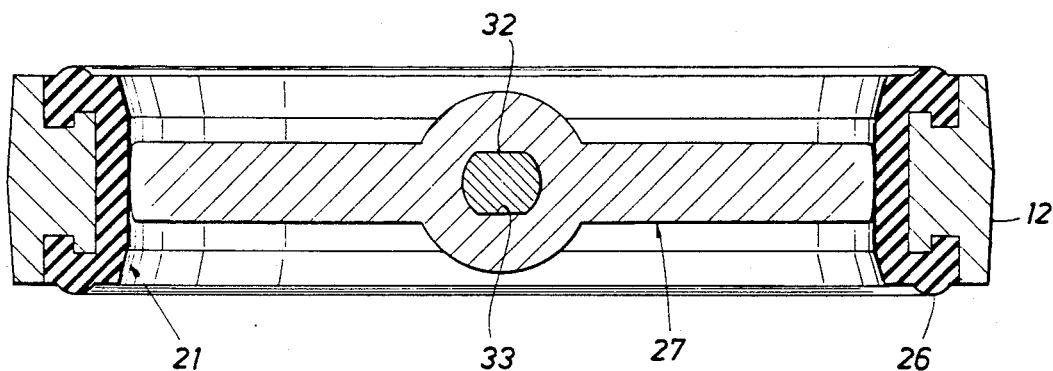
FIG. 3 is a horizontal cross-sectional view of the valve, on an enlarged scale, and as seen along broken lines 3—3 of FIG. 2.
Figure 5:
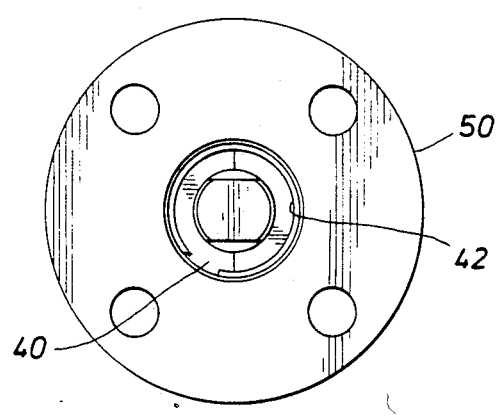
FIG. 5 is a view from the top of the valve, as seen along broken lines 5—5 of FIG. 4.

With reference now to the details of the abovedescribed drawings, the overall valve, which is indicated in its entirety by reference character 10, includes a valve body 11 having an annular hub 12 and a neck 12 extending outwardly from the side of the hub and having a bore 13 therethrough which extends radially of the hub. As shown in FIG. 1, the ends of the hub are adapted to be disposed between flanges 14 on the ends of conduits 15 and a flange 17 on the hub has holes therethrough which are adapted to receive bolts 19 extending through holes in the flanges to support the hub in axial alignment with the conduits. Thus, nuts 20 may be made up with the bolts to draw the flanges of the conduits toward one another and thus hold the ends of the hub tightly therebetween, or backed off to permit the hub to be removed from between the flanges upon removal of the bolts from within the holes in the flange 17.

The valve also includes an annular seat 21 of rubber or other suitable material having an inner wall 22 over the inner diameter of the hub and flanges 23 extending outwardly from each end of the inner wall and disposed over the ends of the hub in position to be sealably engaged by the flanges 14 on the conduits when the flanges are drawn toward one another with the hub disposed between them. The seat is releasably retained on the hub by means of a tongue and groove connection between them comprising a "T" shaped member 24 on the hub, and a correspondingly shaped groove 25 formed about the seat for fitting over the member 24 whereby the flanges of the seat may be spread to permit the seat to be installed and removed from the "T" shaped member. The outer wall of each flange has an annular bead 26 formed thereon which is adapted to be engaged by the flanges of the conduits and deformed into tight sealing engagement therewith.

The valve also includes a disc 27 having an outer periphery adapted to fit tightly within the inner wall of the seat and mounted on a stem 28 for rotation therewith between a position in which it extends across the seat to close the valve, as shown in FIGS. 1, 2 and 3, and another position, not shown, in which the disc is disposed transverse to the seat so as to open the valve. The stem 28 includes an outer end 28A which is closely received in the bore 13 of the neck 12 for rotation therein, an inner end 28B which is closely received in a hole 29 in the hub diametrically opposite the bore 13 for rotation therein, and an intermediate portion 28C which extends through a hole 31 diametrically through the disc 27. The inner and outer ends of the stem also extend closely through diametrically opposed holes 30 in the inner wall of the seat so as to form a sliding seat therewith upon rotation of the stem.

The end of the intermediate portion 28C of the stem adjacent inner end 28B thereof has flat surfaces 32 formed thereon which are parallel to one another and closely engageable with flat surfaces 33 formed in the end of hole 31 through which the central portion of the stem extends so as to provide a driving or rotatable connection between them. More particularly, the surfaces lie within planes which are parallel to the axis of rotation of the stem so that the stem may be moved axially into and out of the operating position of FIGS. 1 and 2. The inner end 28B of the stem is of a diameter approximately as large as the distance between the flat sides 32 of the stem.

As shown in FIGS. 1 and 2, the lower end of the stem 28B is seated within the hole 29 to hold a shoulder 34 at the intersection of the upper part of the stem above surfaces 32 above a shoulder 35 formed at the upper ends of the hole 31 above the flat sides 33. Thus, the weight of the stem is supported from the hub, rather than from the seat, to reduce the likelihood of uneven compression of the seat when the valve is mounted in an upright position, as shown in FIGS. 1 and 2.

As previously described, the periphery of the disc is adapted to tightly engage the inner wall of the seat, and thus to sealably engage therewith. Preferably, the periphery is spherically shaped about a center along the axis of rotation of the stem midway the opposite ends of the hole 31 to facilitate movement of the annular portions of the periphery at each end of the hole through the disc into tight sealing engagement with the flat inner side of the inner wall of the seat. As shown, the opposite ends of the inner wall 22 of the seat are shaped conically to further facilitate movement of the disc periphery into sealing engagement with the seat.

The outer end 13A of the bore 13 through the neck is diametrically enlarged, and the stem is adapted to be retained in its operating position mounting the disc for rotation between opened and closed position by means which includes a pair of C-rings 40 having inner edges adapted to fit within a groove 41 about the outer end 28A of the stem and outer edges which fit closely within the outer end of the bore so as to hold them in the groove. More particularly, a spring type, split retainer ring 42 is adapted to snap into a groove 43 formed about the bore in position to yieldably engage the outer edges of C-rings and thus hold them and the stem within the bore. As used herein, a "groove" has opposite sides, a closed end and an open end such that the rings 40 and 42, when disposed therein, are prevented from movement axially with respect to the stem and bore.

Figure 6:
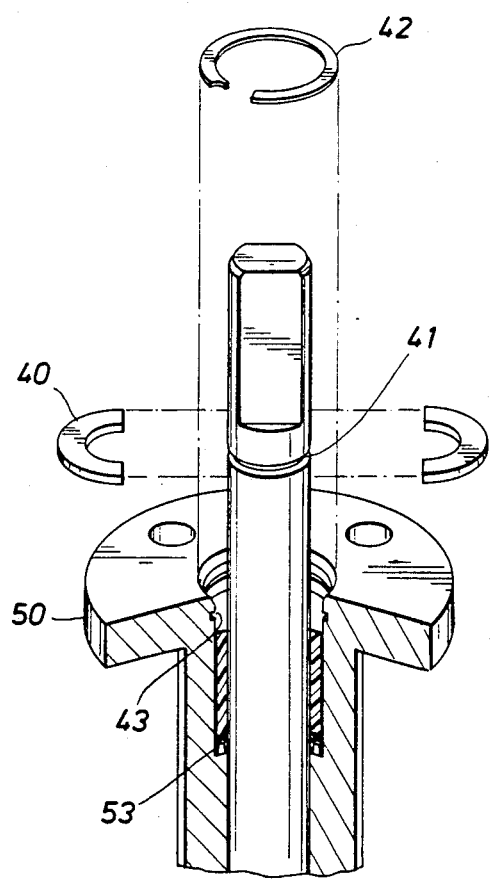
FIG. 6 is a perspective view of the upper end of the stem and housing, as shown in FIG. 4, and showing the outer end of the stem raised and the parts for retaining the stem in exploded positions.

The ends of the retaining ring 42 may be engaged by a suitable tool to distort it into a position in which it may be removed from within the groove and thus raised from the outer end 13A of the bore. As shown in FIG. 6, this permits the stem to be raised upwardly and thus removed from the disc and seat for repair or replacement. In order to assemble or reassemble the valve, the stem is held in a raised position to permit C-rings 40 to be installed in the groove 41, and then lowered with the C-rings into a position in which the stem is seated in the hole 29 and the C-rings are closely received beneath the groove 43 in the bore. The retainer ring 42 may be compressed by pulling its free ends toward one other to permit it to slide into the upper end of the enlarged portion 13A of the groove and opposite the groove 43, and then released to permit it to snap into the groove.

As shown, the neck 12 is formed as one piece with the hub, and the flange 17 is formed as one piece with the hub and neck. The neck has a flange 50 on its upper end on which an actuator (not shown) may be mounted for engaging a non-circular part 52 on the outermost end of end 28 of the stem in order to impart rotation thereto. The neck is shown to be of a length which permits insulation or the like to be disposed about it intermediate the flange 50 and the hub.

Figure 4:
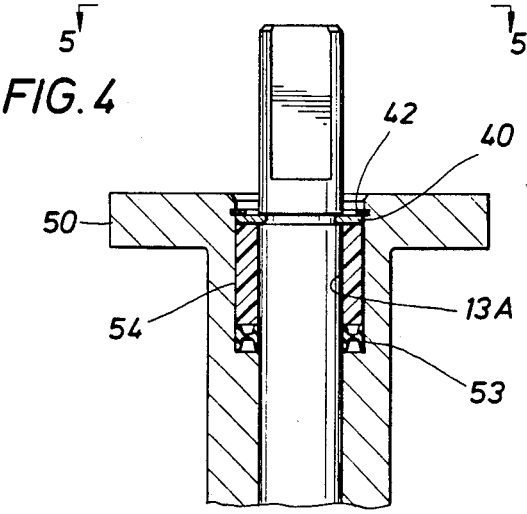
FIG. 4 is an enlarged sectional view of the upper end of the stem, showing the seal ring, bushing and stem retaining means installed within the enlarged outer end of the bore through the neck.

As best shown in FIGS. 4 and 6, a seal ring 53 surrounds the outer end 28A of the stem within the enlarged portion 13A of the bore for seating therebetween, and a bushing 54 is closely received between the stem and bore to absorb side thrust of the actuator. The seal ring is supported on a seat at the end of the bore 13A, and the bushing is above the ring below split ring 40 to hold them in place. The seal ring 53 has lips on its opposite ends which are tightly engaged between the end of the stem and the bore so as to seal in both directions—i.e., against intrusion of foreign material from outside of the valve as well as to provide a secondary seal to prevent line fluid from moving therepast.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A butterfly valve, comprising a body including an annular hub having opposite ends disposable between spaced apart ends of a flowline and a neck extending from the side of the hub and having a bore therethrough, said bore having an outer enlarged cylindrical surface and an end surface at one end of the cylindrical surface, a seat of resilient material on the inner side of the hub, a disc having an outer periphery for tightly engaging the seat, a stem having an inner end fitting closely through the seat and into a hole in the hub, an inner end fitting closely through the seat and into a hole in the hub, an outer end fitting closely through the seat and the bore through the neck, and a portion intermediate its end extending through the disc and including a non-circular part fitting closely within a non-circular part of the disc, whereby the disc may be rotated with the stem between open and closed positions by means of an actuator connected to said outer end of the stem, said stem being moveable axially into and out of close-fitting position within the hub seat and disc, and a seal ring about the stem within the cylindrical surface of the bore and supported on the end surface thereof for sealably engaging there between, a bushing about the stem and supported on the seal ring within the cylindrical surface of the bore, and means retaining the stem, seal ring and bushing in said positions including a groove about the cylindrical surface, a groove about the stem, ring segments having inner edges releasably disposed within the groove about the stem and over the bushing and outer edges fitting closely within the cylindrical surface to hold inner edges in the stem groove, and a ring in the groove about the cylindrical surface and engaging the outer sides of the ring segments, said ring being split at one location about its circumference to permit it to be sprung into and out of the groove in the bore when removed from within the cylindrical surface.

* * * * *